US010050250B2

(12) United States Patent
Park et al.

(10) Patent No.: US 10,050,250 B2
(45) Date of Patent: Aug. 14, 2018

(54) ANODE FOR LITHIUM SECONDARY BATTERY AND LITHIUM ION SECONDARY BATTERY INCLUDING THE SAME

(71) Applicant: LG Chem, Ltd., Seoul (KR)

(72) Inventors: Sung Joon Park, Daejeon (KR); Ho Jin Jeon, Daejeon (KR); Bo Hyun Kim, Daejeon (KR); Dae Sik Choi, Daejeon (KR); Jung Ho Park, Daejeon (KR); Jae Sik Yoon, Daejeon (KR); Yong Pal Park, Daejeon (KR); Seung Don Choi, Daejeon (KR); Hye Jin Kang, Daejeon (KR)

(73) Assignee: LG Chem, Ltd. (KR)

(*) Notice: Subject to any disclaimer, the term of this patent is extended or adjusted under 35 U.S.C. 154(b) by 187 days.

(21) Appl. No.: 14/463,725

(22) Filed: Aug. 20, 2014

(65) Prior Publication Data

US 2014/0356674 A1    Dec. 4, 2014

Related U.S. Application Data

(63) Continuation of application No. PCT/KR2014/003848, filed on Apr. 30, 2014.

(30) Foreign Application Priority Data

May 6, 2013    (KR) .................. 10-2013-0050595

(51) Int. Cl.
*H01M 4/00* (2006.01)
*H01M 2/26* (2006.01)
(Continued)

(52) U.S. Cl.
CPC ............. *H01M 2/263* (2013.01); *H01M 4/13* (2013.01); *H01M 4/661* (2013.01); *H01M 4/667* (2013.01);
(Continued)

(58) Field of Classification Search
CPC ................. H01M 2/026; H01M 2/263; H01M 2004/027; H01M 4/0404; H01M 4/13; H01M 10/05; H01M 10/0431
See application file for complete search history.

(56) References Cited

U.S. PATENT DOCUMENTS 3,222,270 A * 12/1965 Edwards .................. C01D 1/00
                                                          204/269
4,622,277 A    11/1986 Bedder et al.
(Continued)

FOREIGN PATENT DOCUMENTS

CN         1783568 A      6/2006
CN       101299456 A     11/2006
(Continued)

OTHER PUBLICATIONS

International Search Report from PCT/KR2014/003848, dated Aug. 14, 2014.
(Continued)

*Primary Examiner* — Nicholas P D'Aniello
*Assistant Examiner* — Abibatu O Ojo-Amoo
(74) *Attorney, Agent, or Firm* — Lerner, David, Littenberg, Krumholz & Mentlik, LLP

(57) ABSTRACT

Provided are an anode for a secondary battery including an anode collector, an anode active material coated on the anode collector, and a non-coating portion (anode tab) which protrudes from one side of the anode collector and is not coated with an anode active material, wherein the anode includes a metal member which is bonded to the non-coating portion and has higher reactivity or reducibility with respect to a metal oxide than the anode collector, and a secondary battery including the anode.

10 Claims, 1 Drawing Sheet

(51) Int. Cl.
  H01M 4/66 (2006.01)
  H01M 4/13 (2010.01)
  H01M 10/04 (2006.01)
  H01M 10/0525 (2010.01)

(52) U.S. Cl.
  CPC .... H01M 10/0431 (2013.01); H01M 10/0525 (2013.01); H01M 2300/0017 (2013.01)

(56) References Cited

U.S. PATENT DOCUMENTS

| | | | |
|---|---|---|---|
| 5,728,482 A | 3/1998 | Kawakami et al. | |
| 2004/0234861 A1 | 11/2004 | Kawase et al. | |
| 2006/0127751 A1 | 6/2006 | Woo | |
| 2007/0048613 A1* | 3/2007 | Yanagida | H01M 4/66 429/245 |
| 2008/0274398 A1 | 11/2008 | Kim | |
| 2013/0022865 A1 | 1/2013 | Nishinaka et al. | |

FOREIGN PATENT DOCUMENTS

| | | |
|---|---|---|
| JP | H06-187996 A | 7/1994 |
| JP | H09231962 A | 9/1997 |
| JP | H11250900 A | 9/1999 |
| JP | 2004-311141 A | 11/2004 |
| JP | 2007095656 A | 4/2007 |
| JP | 2009123374 A | 6/2009 |
| JP | 2009187753 A | 8/2009 |
| JP | 2013026057 A | 2/2013 |
| KR | 100871917 B1 | 12/2008 |
| KR | 20110137891 A | 12/2011 |
| WO | 2013031523 A1 | 3/2013 |

OTHER PUBLICATIONS

Supplemental Search Report from European Application No. 14784181.1, dated May 15, 2015.

* cited by examiner

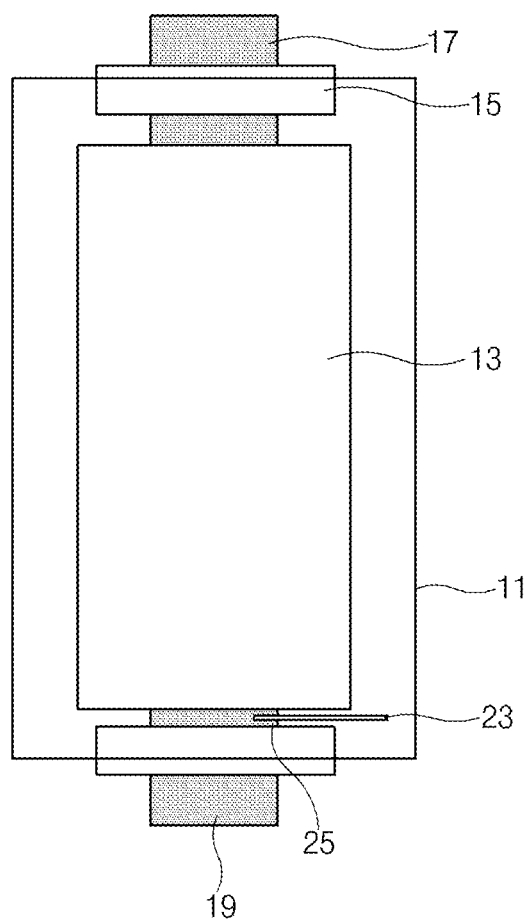

ANODE FOR LITHIUM SECONDARY BATTERY AND LITHIUM ION SECONDARY BATTERY INCLUDING THE SAME

CROSS-REFERENCE TO RELATED APPLICATIONS

The present application is a continuation of International Application No. PCT/KR2014/003848 filed on Apr. 30, 2014, which claims the benefit of Korean Patent Application No. 10-2013-0050595 filed on May 6, 2013, the disclosures of which are incorporated herein by reference.

TECHNICAL FIELD

The present invention relates to an anode for a lithium secondary battery which may prevent the formation of dendrites in a battery, and a lithium ion secondary battery including the anode.

BACKGROUND ART

In line with the development in advanced technology areas such as portable electronic devices including digital cameras, cellular phones, and notebook computers, and high-power hybrid vehicles, research into secondary batteries, which are chargeable and dischargeable, has been actively conducted as their power sources instead of non-rechargeable primary batteries.

Secondary batteries may include nickel-cadmium batteries, nickel-metal hydride batteries, nickel-hydrogen batteries, and lithium secondary batteries, and among these batteries, application areas of lithium secondary batteries tend to be rapidly increased as the lithium secondary batteries are known to have operating voltages that are three times (3.6 V) or more higher than those of typical nickel-cadmium batteries and nickel-metal hydride batteries, and excellent energy density characteristics per unit weight.

In order to stably use these lithium secondary batteries over a prolonged period of time, there is a need to suppress the formation of dendrites which are formed in an acicular shape on the surface of an anode. The dendrites are formed by the precipitation of metal foreign matters (iron (Fe), copper (Cu), nickel (Ni), cobalt (Co), manganese (Mn), zinc (Zn), tin (Sn), zirconia (Zr), etc.) on the surface of the anode while the metal foreign matters formed from an electrode during the preparation of a cell are oxidized. The dendrites may not only degrade the cycle performance of a battery, but also may increase a cell failure rate and may cause an internal electrode short circuit while the dendrites connect cathode and anode to each other by penetrating through a separator due to external pressure or vibration. Thus, the dendrites may reduce the safety of the cell.

Therefore, in order to prepare a lithium secondary battery having improved safety and stability, there is a need to develop a secondary battery that may suppress the formation of dendrites connecting cathode and anode.

DISCLOSURE OF THE INVENTION

Technical Problem

According to an aspect of the present invention, the present invention provides an anode for a secondary battery which may suppress the formation of dendrites on the surface thereof.

According to another aspect of the present invention, there is provided a secondary battery including the anode.

Technical Solution

According to an aspect of the present invention, there is provided an anode for a secondary battery including:
   an anode collector;
   an anode active material coated on the anode collector; and
   a non-coating portion (anode tab) which protrudes from one side of the anode collector and is not coated with an anode active material,
   wherein the anode includes a metal member which is bonded to the non-coating portion and has higher reactivity or reducibility with respect to a metal oxide than the anode collector.

According to another aspect of the present invention, there is provided a secondary battery including the anode.

Specifically, provided is a secondary battery including:
   an electrode assembly formed by winding a cathode and an anode, which are formed by coating at least one surface of each metal current collector with each active material, and a separator; and
   a case accommodating the electrode assembly and a non-aqueous electrolyte solution,
   wherein the secondary battery includes a plurality of cathode non-coating portions and of anode non-coating portions (cathode tabs and anode tabs) which protrudes from the each metal current collector and is not coated with an active material,
   a metal member bonded to the anode non-coating portion and disposed in the case, and
   a cathode lead and an anode lead which are respectively electrical connected to the cathode non-coating portion and the anode non-coating portion and protrude from the outside of the case.

Advantageous Effects

According to the present invention, since a metal member, which suppresses the formation of dendrites on an anode non-coating portion during the preparation of a secondary battery and reduces the incidence of internal short circuits, may be formed, the safety of the battery may be improved.

BRIEF DESCRIPTION OF THE DRAWINGS

FIG. 1 is a plan view illustrating a lithium secondary battery according to an embodiment of the present invention.

DESCRIPTION OF THE SYMBOLS

11: battery case
13: electrode assembly
15: insulating film
17: cathode lead
19: anode lead
23: metal member
25: bonded portion between anode collector and metal member

MODE FOR CARRYING OUT THE INVENTION

Hereinafter, the present invention will be described in detail.

Specifically, according to the present invention, provided is an anode for a secondary battery including:

an anode collector, an anode active material coated on the anode collector, and a non-coating portion (anode tab) which protrudes from one side of the anode collector and is not coated with an anode active material, wherein the anode includes a metal member which is bonded to the non-coating portion and has higher reactivity or reducibility with respect to a metal oxide than the anode collector.

In the anode of the present invention, the anode collector is not particularly limited so long as it has high conductivity without causing adverse chemical changes during charge and discharge. The anode collector may be formed of, for example, steel; aluminum; copper; nickel; titanium; calcined carbon; or aluminum or stainless steel that is surface-treated with carbon, nickel, titanium, silver, or the like.

Also, the metal member is not particularly limited so long as it is a material having characteristics, in which the material has higher oxidation reactivity or reducibility with respect to oxides of metals, such as iron (Fe), copper (Cu), nickel (Ni), cobalt (Co), manganese (Mn), zinc (Zn), tin (Sn), and zirconia (Zr), than the anode collector and does not cause a side reaction in a battery. Specifically, the metal member may include a single material selected from the group consisting of aluminum, gold, silver, platinum, and an alloy thereof, or a mixture of two or more thereof. For example, the metal member may be formed of aluminum or an alloy thereof.

Also, the metal member may be point-contacted with one side of the non-coating portion, or may be formed to cover an entire surface of the non-coating portion.

The metal member may be bonded to the non-coating portion by a typical welding method, and for example, may be bonded using a laser welding, ultrasonic welding, or resistance welding.

Furthermore, the metal member may be bonded substantially without a step height. That is, in a case where electrode and separator are wound to prepare a cylindrical type battery, since a large amount of pressure is particularly applied to a boundary between an active material coated portion of a current collector and a non-coating portion in comparison to other places, electrical disconnection is likely to occur. Thus, in a case where a step height is formed between the anode active material coated portion and the non-coating portion having the metal member bonded thereto, damage to the entire surface of the current collector may occur when the pressure is applied to the anode collector. Therefore, it is desirable to allow the entire surface of the anode collector to be uniformly pressurized by forming the metal member substantially without a step height with respect to the anode collector and the non-coating portion of the anode collector. In this case, the expression "substantially without a step height" denotes that a step height is sufficiently small enough for the current collector to be uniformly pressurized as described above.

Specifically, the metal member may be a rectangular or elliptical sheet member or plate member having a thickness of about 0.001 mm to about 5 mm and a length of about 0.1 mm to about 10 mm. In addition, the metal member may be formed in the shape of a strip or a pipe. In the case that the thickness of the metal member is 0.001 mm or less, bonding may be substantially difficult to reduce productivity, and in the case in which the thickness of the metal member is greater than 5 mm, the thickness of the battery may unnecessarily increase and a large step height may be formed.

In the present invention, since the metal member having higher reactivity than the anode collector is additionally bonded to the portion of the anode collector, for example, the one side of the non-coating portion, during the preparation of the anode, metal foreign matters oxidized during charge and discharge are allowed to first precipitate on the surface of the metal member by reacting with the metal member before the oxidized metal foreign matters precipitate on the surface of the anode. Thus, the formation of dendrites on the surface of the anode may be suppressed.

For example, in a case where a metal member using aluminum, or a metal member using a metal having high reducibility, such as gold, is bonded to a portion of an anode collector using copper, since the aluminum or the metal having high reducibility has higher reactivity than the copper, metal impurities may first react with the aluminum or the metal having high reducibility, i.e., the metal member, before the metal impurities react with the surface of the anode. As a result, since dendrites are formed while the metal impurities in an oxidized state are first reduced on the surface of the metal member before the metal impurities in an oxidized state are adhered to the surface of the anode, the formation of dendrites on the surface of the anode may be suppressed.

Also, the present invention may provide a secondary battery including the anode.

Specifically, the present invention may provide a secondary battery including an electrode assembly formed by winding a cathode and an anode, which are formed by coating at least one surface of each metal current collector with each active material, and a separator; and a case accommodating the electrode assembly and a non-aqueous electrolyte solution, wherein the secondary battery includes a plurality of cathode non-coating portions and of anode non-coating portions (cathode tabs and anode tabs) which protrudes from the each metal current collector and is not coated with an active material, a metal member bonded to the anode non-coating portion and disposed in the case, and a cathode lead and an anode lead which are respectively connected electrically to the cathode and anode non-coating portions and protrude from the outside of the case.

In this case, in the secondary battery of the present invention, the cathode collector is not particularly limited so long as it has high conductivity without causing adverse chemical changes in the batteries. The cathode collector may be formed of, for example, stainless steel, aluminum, nickel, titanium, calcined carbon, or aluminum or stainless steel that is surface-treated with carbon, nickel, titanium, silver, or the like. The collector may have an uneven surface to improve the bonding strength of a cathode active material and may have any of various shapes such as that of a film, a sheet, a foil, a net, a porous body, a foam body, a non-woven fabric body, and the like.

Also, the cathode active material, for example, may include a layered compound such as lithium cobalt oxide ($LiCoO_2$) and lithium nickel oxide ($LiNiO_2$), or a compound substituted with at least one transition metal; a lithium manganese oxide such as the chemical formula $Li_{1+x}Mn_{2-x}O_4$ (where x ranges from 0 to 0.33), $LiMnO_3$, $LiMn_2O_3$, and $LiMnO_2$; lithium copper oxide ($Li_2CuO_2$); vanadium oxide such as $LiV_3O_8$, $V_2O_5$, and $Cu_2V_2O_7$; nickel (Ni)-site type lithium nickel oxide expressed by the chemical formula $LiNi_{1-x}M_xO_2$ (where M=Co, Mn, aluminum (Al), Cu, Fe, magnesium (Mg), boron (B), or gallium (Ga), and x ranges from 0.01 to 0.3); lithium manganese complex oxide expressed by the chemical formula $LiMn_{2-x}M_xO_2$ (where M=Co, Ni, Fe, chromium (Cr), Zn, or tantalum (Ta), and x ranges from 0.01 to 0.1) or $Li_2Mn_3MO_8$ (where M=Fe, Co, Ni, Cu, or Zn); a $LiMn_2O_4$ disulfide compound in which a part of lithium of the chemical formula is substituted with alkaline earth metal ions; or $Fe_2(MoO_4)_3$ but the present invention is not limited thereto.

For example, the anode active material may include: carbon such as hard carbon and graphite-based carbon; a complex metal oxide such as $Li_xFe_2O_3$ ($0 \leq x \leq 1$), $Li_xWO_2$ ($0 \leq x \leq 1$), $Sn_xMe_{1-x}Me'_yO_z$ (Me: manganese (Mn), Fe, lead (Pb), or germanium (Ge); Me': Al, B, phosphorus (P), silicon (Si), Groups I, II and III elements, or halogen; $0 < x \leq 1$; $1 \leq y \leq 3$; $1 \leq z \leq 8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; or a Li—Co—Ni-based material.

The cathode and anode active materials may further include a binder, a filler, and a conductive agent which are typically used in the preparation of a secondary battery.

Also, in the secondary battery of the present invention, the separator may be typically formed of a porous thermoplastic resin such as polyethylene (PE) and polypropylene (PP).

Furthermore, the electrolyte solution is a lithium salt-containing non-aqueous electrolyte solution, wherein the non-aqueous electrolyte solution may include a carbonate-based compound to prevent corrosion of the metal member.

Specifically, the carbonate-based compound may include a single material selected from the group consisting of cyclic carbonate including ethylene carbonate (EC) and propylene carbonate (PC); linear carbonate including diethyl carbonate (DEC), dimethyl carbonate (DMC), ethylmethyl carbonate (EMC), and dipropyl carbonate (DPC); dimethyl sulfoxide, acetonitrile, dimethoxyethane, diethoxyethane, tetrahydrofuran, N-methyl-2-pyrrolidone (NMP), methyl propionate, ethyl propionate, propyl propionate, and γ-butyrolactone (GBL), or a mixture of two or more thereof.

The secondary battery of the present invention having the above-described structure may exhibit high energy density, high-power characteristics, improved safety, and stability.

Hereinafter, an example and a comparative example of the present invention will be described. However, the following example describes a preferred example of the present invention, and the present invention is not limited thereto.

EXAMPLES

Example

A typical cathode mixture slurry was prepared, and a cathode sheet was then prepared by coating, drying, and pressing the cathode mixture slurry on a long sheet-type aluminum foil. An anode sheet was prepared by coating, drying, and pressing a typical anode active material on a copper foil. An aluminum metal member was laser-welded to a non-coating portion of the anode sheet. Next, an anode, a separator, a cathode, a separator, and an anode were sequentially stacked and then wound to be accommodated in a cylindrical type battery case. A carbonate-based electrolyte solution of 1 M $LiPF_6$ was injected into the battery case to prepare a cylindrical type battery.

Comparative Example

A cylindrical type battery was prepared in the same manner as in the example except that a process of bonding the aluminum metal member to the non-coating portion of the anode sheet was not performed.

Experimental Example low-voltage failure rate and internal micro-short circuit tests 1% of Cu oxide was added to cathodes of the secondary batteries prepared in the example and the comparative example, and low-voltage failure rate and the incident of internal micro-short circuit were then measured for each battery. In order to improve the reliability of the tests, 10 batteries of each of the example and the comparative example were prepared. The results thereof are presented in Table 1 below.

TABLE 1

| Category | Low-voltage failure rate (number of samples: 10) | Incidence of internal micro-short circuit |
|---|---|---|
| Example | 0% | 0% |
| Comparative example | 40% | 40% |

As illustrated in Table 1, with respect to the secondary battery including the non-coating portion to which the metal member of the example of the present invention was bonded, it may be confirmed that low-voltage failure rate and the incidence of internal short circuit were significantly decreased in comparison to the secondary battery of the comparative example.

The invention claimed is:

1. An anode for a secondary battery, the anode comprising:
    an anode collector;
    an anode active material coated on the anode collector; and
    an anode tab which protrudes from one side of the anode collector and is not coated with an anode active material,
    wherein the anode comprises a metal member which is bonded to the anode tab and has higher reactivity or reducibility with respect to a metal oxide than the anode collector,
    the metal member being electrically connected and directly physically connected only with the anode tab,
    wherein the anode collector and the anode tab comprise copper, and
    wherein the metal member comprises a single material of aluminum.

2. The anode for a secondary battery of claim 1, wherein the metal member is point-contacted with one side of the anode tab, or is formed to cover an entire surface of the anode tab.

3. The anode for a secondary battery of claim 1, wherein the metal member is bonded to the anode tab using a laser welding, ultrasonic welding, or resistance welding.

4. The anode for a secondary battery of claim 1, wherein the metal member is bonded with the anode collector without a step height.

5. The anode for a secondary battery of claim 1, wherein the metal member is a rectangular- or elliptical-shaped sheet member or plate-shaped member.

6. The anode for a secondary battery of claim 5, wherein the metal member has a thickness of 0.001 mm to 5 mm and a length of 0.1 mm to 10 mm.

7. A secondary battery comprising: an electrode assembly including: a cathode formed by coating at least one surface of a metal current collector with an active material, the cathode having a cathode tab protruding from the metal current collector and not coated with the active material, the anode for a secondary battery of claim 1, and a separator, wherein the electrode assembly is formed by winding the cathode, the anode, and the separator; and a case accommodating the electrode assembly and a non-aqueous electrolyte solution, a metal member disposed in the case and not electrically connected with the cathode tab, and a cathode lead and an anode lead which are respectively connected electrically to the cathode tab and the anode tab and protrude from outside of the case.

8. A secondary battery comprising: an electrode assembly including: a plurality of cathodes, each formed by coating at least one surface of a metal current collector with an active material, each cathode having a cathode tab protruding from the metal current collector and not coated with the active material, a plurality of anodes each including an anode collector, an anode active material coated on the anode collector, and an anode tab which protrudes from one side of the anode collector and is not coated with an anode active material, wherein the anode collector and the anode tab comprise copper, and a plurality of separators; wherein the electrode assembly is formed by winding the plurality of cathodes, the plurality of anodes, and the plurality of separators; and a case accommodating the electrode assembly and a non-aqueous electrolyte solution, a metal member bonded to the anode tabs of at least one of the plurality of anodes, and disposed in the case, the metal member having higher reactivity or reducibility with respect to a metal oxide than the anode collector, the metal member being electrically connected and directly physically connected only with the anode tab of the at least one of the plurality of anodes, wherein the metal member comprises a single material of aluminum, and a cathode lead and an anode lead which are respectively connected electrically to the plurality of cathode tabs and the plurality of anode tabs and protrude from outside of the case.

9. The secondary battery of claim 8, wherein the non-aqueous electrolyte solution comprises a single material selected from the group consisting of cyclic carbonate including ethylene carbonate (EC) and propylene carbonate (PC); diethyl carbonate (DEC), dimethyl carbonate (DMC), ethylmethyl carbonate (EMC), dipropyl carbonate (DPC), dimethyl sulfoxide, acetonitrile, dimethoxyethane, diethoxyethane, tetrahydrofuran, N-methyl-2-pyrrolidone (NMP), methyl propionate, ethyl propionate, propyl propionate, and γ-butyrolactone (GBL), or a mixture of two or more thereof.

10. The anode for a secondary battery of claim 2, wherein the metal member is bonded to the anode tab using a laser welding, ultrasonic welding, or resistance welding.

* * * * *